United States Patent [19]

Nottoli

[11] 4,084,331
[45] Apr. 18, 1978

[54] BACKGAMMON TEACHING DEVICE

[76] Inventor: Le Roi G. Nottoli, 5843 N. Cicero Ave., Chicago, Ill. 60646

[21] Appl. No.: 723,260

[22] Filed: Oct. 27, 1976

[51] Int. Cl.² .......................... G09B 19/22; A63F 3/00
[52] U.S. Cl. ...................................... 35/8 R; 35/9 E; 273/248
[58] Field of Search ........... 273/130 R, 131 R, 131 B, 273/132, 134 G, 135 R, 136 R, 136 H, 136 K; 35/8 R, 8 B, 9 E, 9 F

[56] References Cited

U.S. PATENT DOCUMENTS 1,915,787  6/1933  Hanley .............................. 273/136 H
3,792,186  2/1974  Principe ................................. 35/8 R Primary Examiner—William H. Grieb

[57] ABSTRACT

A full size conventional Backgammon Board is provided, embodying means for a central portion thereof movable with respect to the Board, said means embodying a plurality of windows. In normal position the windows appear closed. After a proposed move is made the central means are slid so that the windows uncover a diagrammed answer to the propriety of the move. Upon lifting the central portion off the Board, a textual explanation of the answer to the move becomes visible on certain instruction cards containing learning matter.

4 Claims, 7 Drawing Figures

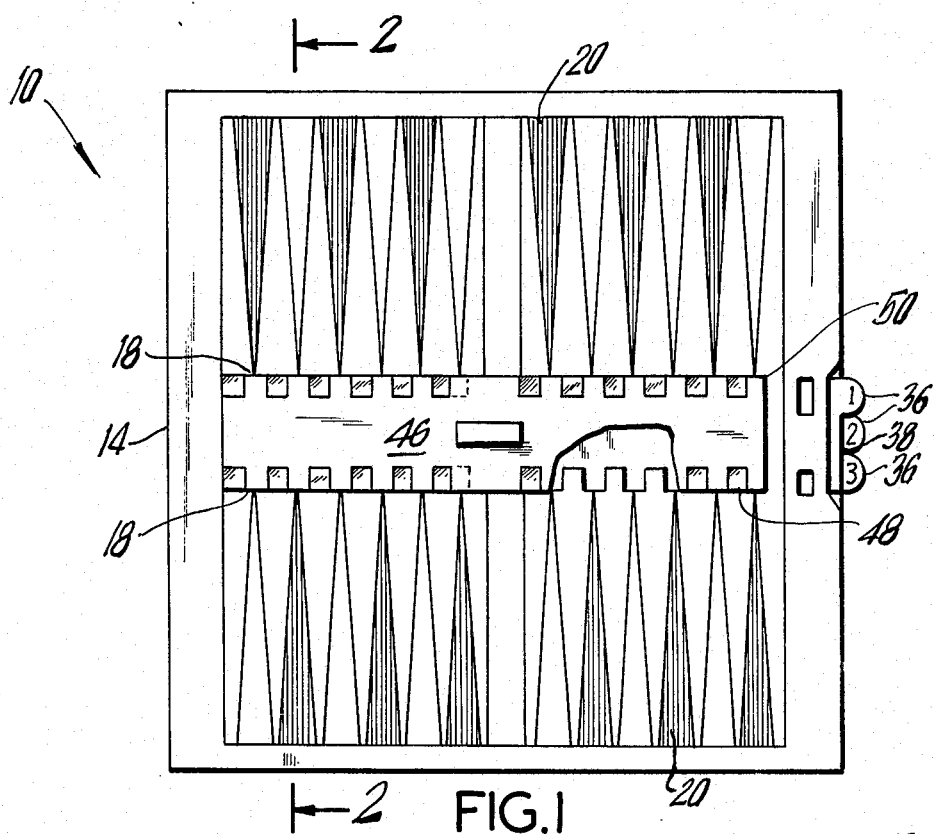
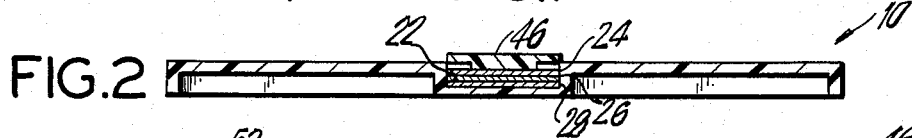
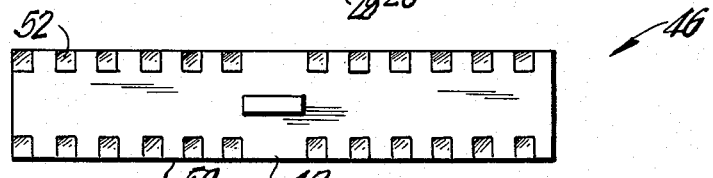
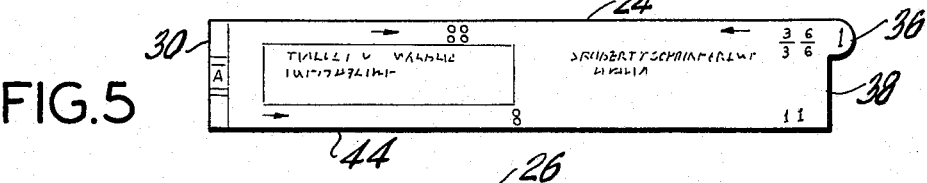
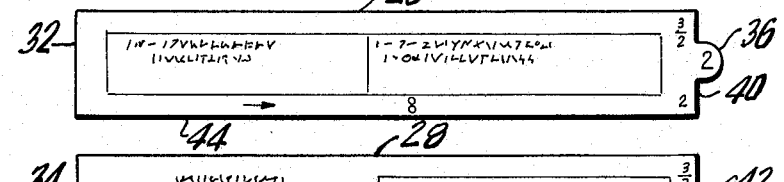
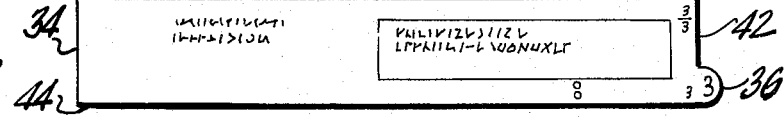

BACKGAMMON TEACHING DEVICE

FIELD OF THE INVENTION

The present invention relates to the game of Backgammon, and generally to the teaching thereof to beginners, and to the improving of the skills of those already conversant with the game.

OBJECTS AND SUMMARY OF THE INVENTION

Accordingly, it is a general purpose and object of the invention to provide improved teaching means for the game of Backgammon. This is accomplished according to the present invention, by providing a flat bottomed, channel like trough extending across the central portion of a Board having the conventional Backgammon game design thereupon. The trough is deep enough to accomodate a plurality of cards therein, upon which textual material relating to the game is imprinted. Disposed above the cards is a removable sliding panel embodying a number of apertures, the top of said panel presenting a flush surface with the rest of the Board. Sliding a panel after a move has been made will position the apertures, or windows, to reveal a code for a diagrammed answer to the move. Thereupon, the player removes the sliding panel from the top of the Board and the texttual material on certain instruction cards which reposed beneath the panel is exposed. The instruction cards contain a complete explanation for the move previously programmed.

A further object of the invention is to provide means whereby beginners and mediocre players may improve their game by measuring themselves against the skill of experts, since the programmed moves are prepared by experts.

A further object is to provide self contained compact Backgammon teaching means all embodied within the Board, without necessity for a separate text.

Other and additional objects will appear obvious to those skilled in the Art, by a consideration of the detailed description which follows, taken together with the accompanying drawing.

BRIEF DESCRIPTION OF THE DRAWINGS

FIG. 1 is a plan view of a preferred embodiment of the present invention.

FIG. 2 is a section view taken along the line 2—2 of FIG. 1, looking in the direction of the arrows.

FIG. 3 is a plan view of the movable panel of the invention.

FIG. 4 is a section view taken along the line 2—2 of FIG. 1, but with all of the components shown in FIGS. 3, 5, 6, and 7, removed from the assembly of FIG. 1.

FIGS. 5, 6, and 7 are plan views of typical instruction cards of the invention, which normally repose within the central portion of the assembly of FIG. 1.

DESCRIPTION OF THE PREFERRED EMBODIMENT OF THE INVENTION

Referring now to FIG. 1, there is shown a conventional Backgammon Board generally designated by the numeral 10. The Board 10 embodies a central trough, or channel like groove 12 (FIG. 4) extending longitudinally along the central area (FIG. 1) of the Board 10. The trough 12 is of such width 16, as to generally border with the apex 18 of a triangle design 20, said triangle design being typical of any conventional Backgammon Board. The trough 12 is further of such depth 22, (FIGS. 2 & 4) that when certain central components shown in FIGS. 3, 5, 6, and 7, and hereinafter more fully explained, are positioned within the central trough 12, the Backgammon Board 10 presents a substantially flush appearance as shown in FIG. 2.

Referring now to FIGS. 5, 6, and 7, there is illustrated certain typical printed instruction cards, 24, 26, and 28 having identical widths respectively, 30, 32, and 34, each of which corresponds substantially to the width 16 of the trough 12, but in such manner that each card is slideable in and out of the trough. Each card 24, 26, and 28 embodies a typical finger tab 36 on the right ends 38, 40, and 42, thereof respectively. The finger tabs 36 are ununiformly positioned along the ends 38, 40, and 42 so that when the cards are stacked in position above one another within the confines of the trough 12, as shown in FIG. 2, each finger tab, viewed in plan view (FIG. 1) will be visible and accessible. The length 44 of each card 24, 26, and 28 corresponds approximately to the length of the longitudinal trough 12.

The cards 24, 26, and 28 contain thereon the written instructions for the correct Backgammon moves to be implemented, in a manner hereinafter described. It will be apparent that while three cards are shown, a greater or lesser number may be employed as required by simply varying correspondingly the depth 22 of the trough 12.

Turning attention now to FIGS. 1 and 3, there is shown a sliding panel 46 normally positioned uppermost within the trough 12 as shown in FIGS. 1, and 2. The sliding panel 46 is substantially the same width and length as the trough 12, and is adaptable to slide therein longitudinally. The panel 46 embodies a plurality of openings, or windows 48, positioned between aligned flat portions 50. There are twelve flat portions 50, on each side of the panel 46, one for each of the twenty four apex points 18 of the triangular designs 20, which comprise the required design on any conventional Backgammon Board. When the sliding panel 46 is in the position herein designated as "closed" the plan view appearance of the board 10, (FIG. 1) is that of a typical conventional Backgammon Board and each of the flat portions 50 abuts with an apex 18 (FIG. 1).

The sliding panel 46 is adaptable to be slid to the right within the trough 12 to the measured extent of the typical width 52 of a typical window 48. (FIGS. 1 & 3). Upon sliding the panel to the right to such extent, an instruction code (not shown here) of any variety of type which may be devised, such as for example, dots, arrows, or similar indicia, will become exposed and visible through one or more typical windows 48, which code employed in co-operation with the correspondingly indicated instruction card will indicate the optimum correct Backgammon move. A player having thus slid the windowed panel 46 to the right to expose the code or indicia therebeneath, now will remove the panel 46 completely off the Board thereby completely exposing the instruction card therebeneath, (card 24 in the present illustration of FIG. 2) so that the written textual instructions on the card 24 become visible and available to the player. The textual matter on the instruction card embodies an analysis of the moves and special notations and instructions as would most likely benefit beginners and mediocre players of the game, since said textual matter is compiled by masters and experts in the game of Backgammon.

Having thus described the invention, in operation, it will be clear to those skilled in the Art, that a player of Backgammon, (red for example) will make a move, and his opponent (black) must reply to the move and thus makes a proposed reply. The sliding panel 46 is now moved to the extent of the width 52 of a typical window 48. Thus a code will become exposed which will indicate the propriety and correctness of the reply. Upon removing the panel 46 from the Board, the instruction card therebeneath is exposed. The card will contain the proper textual material to analyze the move.

According to the foregoing description of a preferred embodiment of the invention, it will be understood that various changes in the details, materials, steps and arrangements of parts which have been herein described and illustrated in order to explain the nature of the invention, may be made by those skilled in the Art, within the principle and scope of the invention as expressed in the appended claims.

I claim:

1. A Backgammon Teaching Device comprising a board of conventional Backgammon design,
trough extending across the central portion of the board adaptable to contain a plurality of movable components, means embodying a plurality of window like openings adapted to slide within the trough, and a plurality of instruction cards within said trough and readable upon removing the panel.

2. A Backgammon Teaching Device as claimed in claim 1 wherein said means comprise a movable panel adapted to slide a measured extent within the trough.

3. A Backgammon Teaching Device comprising a board of conventional Backgammon design,
a trough extending across the central portion of the board adaptable to contain a plurality of movable components, A movable panel embodying a plurality of window like openings adapted to slide within the trough to expose a code beneath the panel to indicate the correctness of a move,
and a plurality of instruction cards within said trough and readable upon removing the panel.

4. A Backgammon Teaching Device comprising a board of conventional Backgammon design,
a channel like trough extending longitudinally across the central portion of the board adapted to contain a plurality of movable components within its confines,
a movable panel embodying a plurality of window like openings adapted to slide a measured distance within the trough to expose a code therebeneath,
and a plurality of instruction cards within said trough having said code thereon and readable upon removing the panel to analyze the correctness of a player's move.

* * * * *